United States Patent

[11] 3,633,430

[72] Inventor Arthur P. Bentley
Box 139, Boerne, Tex. 78006
[21] Appl. No. 5,645
[22] Filed Jan. 26, 1970
[45] Patented Jan. 11, 1972

[54] REDUCTION GEAR TRANSMISSION
7 Claims, 4 Drawing Figs.
[52] U.S. Cl..................................................... 74/690,
74/796, 74/199
[51] Int. Cl.....................................................F16h 15/14,
F16h 37/00, F16h 15/08
[50] Field of Search........................................... 74/796,
802, 690, 199, 691

[56] References Cited
UNITED STATES PATENTS

| | | | |
|---|---|---|---|
| 1,777,490 | 10/1930 | Hardie............................. | 74/802 |
| 1,951,424 | 3/1934 | Lewis............................. | 74/802 |
| 2,086,491 | 7/1937 | Dodge............................. | 74/796 X |
| 2,108,082 | 2/1938 | Sharpe............................ | 74/796 |
| 2,939,345 | 6/1960 | Burns............................. | 74/796 |
| 3,387,507 | 6/1968 | De Castelet.................... | 74/796 |

Primary Examiner—Arthur T. McKeon
Attorney—Schellin and Hoffman

ABSTRACT: This specification discloses a reduction gear transmission comprising an input shaft carrying a pinion, a satellite carrier having a gear meshing with the pinion, a composite satellite gear on said carrier and including two sections, one with a greater number of teeth than the other, an output gear meshing with the satellite gear section having the smaller number of teeth, an output shaft drivably carrying the output gear, and a holding gear meshing with the other section of the satellite gear and having a hub in which the output shaft is journalled. The hub extends through an opening in the housing in which the aforesaid gear mechanism is mounted. An infinite ratio gear assembly is operatively associated with the hub to control its rate of rotation. This gear assembly includes an inner pair of beveled gears in confronting relation, relatively axially movable, and keyed to the output shaft; an outer pair of beveled ring gears in confronting relation to each other and also confronting the inner beveled gears, a mechanical interlock to cause said outer beveled gears to rotate in unison, all of the faces of said beveled gears having radial grooves, a pin ring disposed in the space defined by the faces of the beveled gears, pins carried by said pin ring and having ends received in said grooves, and a ring shifting device to move the ring radially and thereby adjust the radial positions of the pin ends in the grooves.

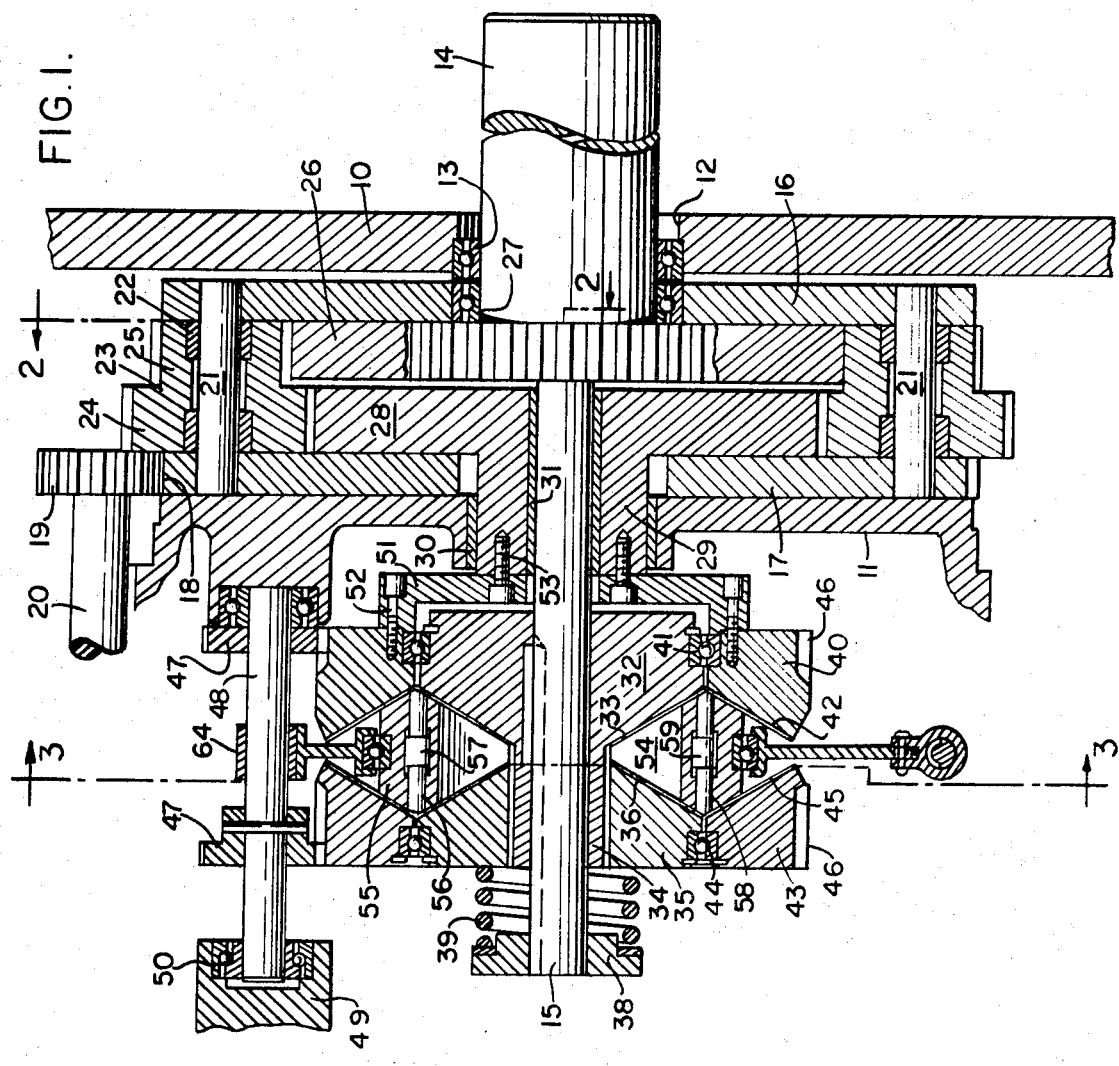

INVENTOR
ARTHUR P. BENTLEY

BY *Schellin & Hoffman*
ATTORNEYS

REDUCTION GEAR TRANSMISSION

The present invention relates to gear transmissions and is concerned primarily with improvements in the reduction gear transmission disclosed in U.S. Pat. No. 3,438,284 and a supplemental infinite ratio gear assembly that is associated with the holding gear of the patented transmission.

BACKGROUND OF THE INVENTION

The above-identified patent discloses a transmission consisting essentially of a power input shaft, a satellite carrier in driving relation to the shaft, a satellite gear having a required number of teeth extending over its effective longitudinal extent, a drive gear drivably mounted on an output shaft and having a prescribed number of teeth meshing with the teeth of the satellite gear, a pair of gears either of which may be constituted a holding gear and one of which has a number of teeth greater than the number on the drive gear, with the teeth of both the latter gears meshing with the teeth of the satellite gear, and means for selectively holding one of the latter gears against rotation relative to the output shaft whereby it is constituted the holding gear and the remaining gear idles.

It is evident that with the teeth of the satellite gear meshing with the teeth of the driving and holding gear, there is a limitation on the differential of the number of teeth between these two gears in a practical operative device. This, of course, means there is a definite limitation on the range of gear ratios that may be provided in such a transmission.

In the patented transmission the gear selected as the holding gear is locked to the output shaft. The art is lacking in a gear mechanism or assembly that is peculiarly adapted for association with the holding gear to provide for a desired degree of rotation thereof relative to the output shaft to thereby provide further variations in the gear ratio between the input and output shafts. Such a mechanism should be susceptible of infinite variations of gear ratios in any predetermined range.

OBJECTS OF THE INVENTION

With the foregoing conditions in mind, the present invention has in view the following objects:

1. The provision, in a gear reduction transmission of the type disclosed in U.S. Pat. No. 3,438,284 of a satellite gear comprising two discrete sections with an appreciable difference in the number of teeth on one section as compared to the number of teeth on the other section; and 2. The provision of a gear assembly that is intended primarily for association with the holding gear of the transmission of said patent and which will afford an infinite number of variations in the gear ratio which provides for rotation of the holding gear.

Various other more detailed objects and advantages of the invention such as arise in connection with carrying out the above noted ideas in a practical embodiment will in part become apparent and in part be hereinafter stated as the description of the invention proceeds.

SUMMARY OF THE INVENTION

The foregoing objects are achieved by providing a reduction gear transmission of the type disclosed in said patent in which the satellite gear comprises two sections or gear elements of different ratios and a different number of teeth on each element. One element meshes with the holding gear and the other with the drive gear. The holding gear is formed with a hub which projects through an opening in a wall of the housing in which the transmission is mounted. The output shaft is journaled in the hub and projects therebeyond. Keyed to the output shaft are an inner pair of relatively movable bevelled gears in confronting relation with the confronting faces being radial grooved. An outer pair of bevel gears in the form of rings are disposed about the inner pair with their confronting faces having radial grooves and also confronting the bevelled faces of the inner pair. A pin ring is positioned in the space defined by the confronting faces and carried thereby are axial pins the ends of which are received in the grooves.

The pin ring is movable in a plane normal to the axis of the output shaft and a shifting device is provided for causing such movement. A mechanical interlock is provided to cause the outer pair of bevelled gears to rotate in unison and the outer pair is connected to the hub of the holding gear.

With the pins engaging the termini of the grooves at the line of juncture between the inner and outer bevelled gears the two pairs will rotate together and no reduction will be afforded by this assembly. However, when the pin ring is shifted some of the pins will be moved radially outwardly and others radially inwardly. Those which move outwardly engage the outer pair at a greater radial distance from the shaft while those that move inwardly engage the inner pair at a lesser radial distance. Thus a differential in the ratio of rotation between the two pair of bevelled gears is obtained and this differential is reflected by the driving connection of the outer pair to the hub of the holding gear.

For a full and more complete understanding of the invention reference may be had to the following description and accompanying drawings wherein:

FIG. 1 is a transverse section through the reduction gear transmission of this invention.

FIG. 2 is a fragmentary section taken about on the plane represented by the line 2—2 of FIG. 1.

Figure 3:
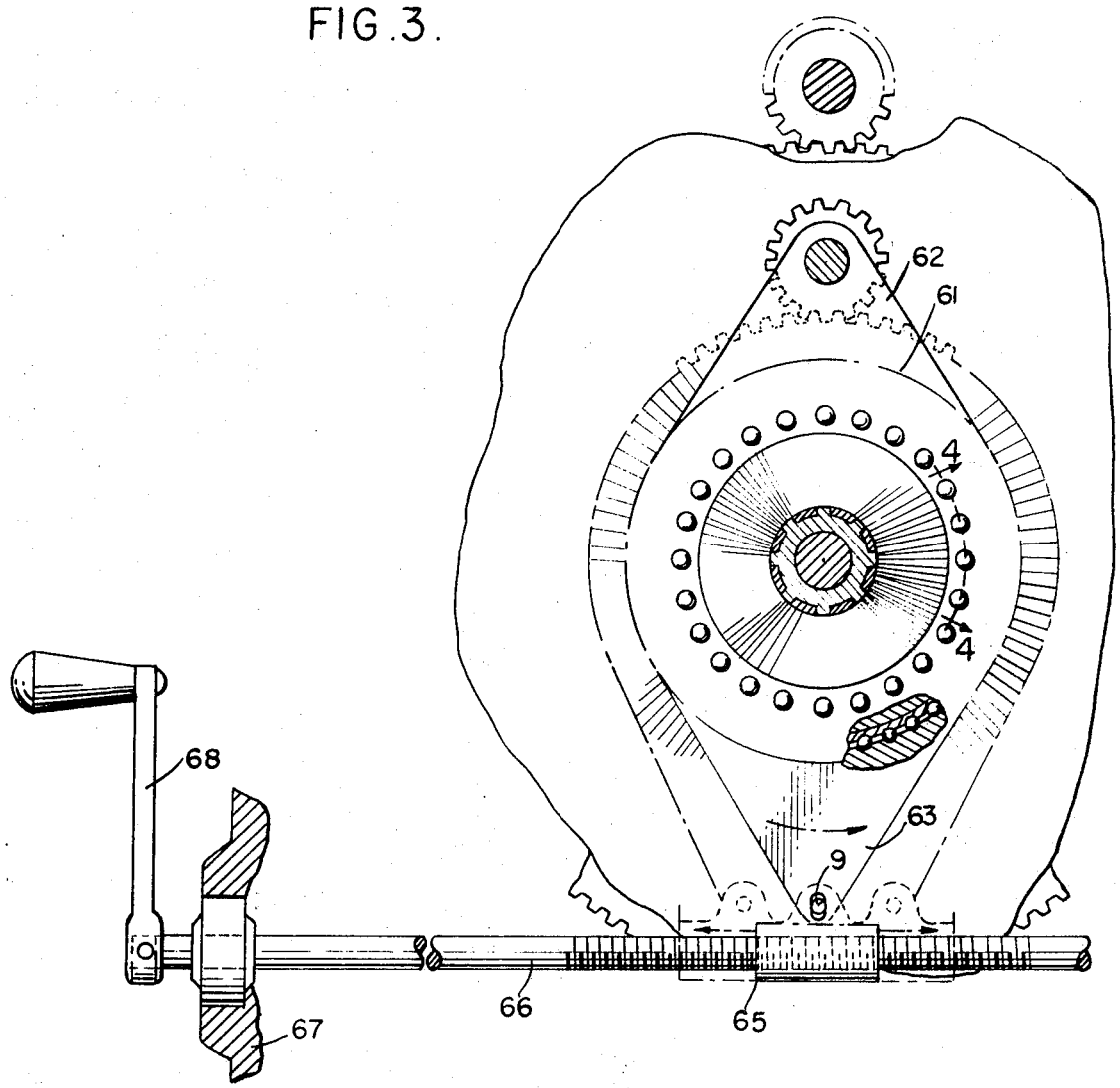
FIG. 3 is a section taken normal to the plane of FIG. 1 and about on the plane represented by the line 3—3 of FIG. 1.

Referring now to the drawings, and first more particularly to FIG. 1 a housing wall is shown at 10 and another at 11. Wall 10 is formed with an opening 12, and journaled therein by a bearing 13 is an output shaft 14 having a reduced extension 15. Rotatably mounted on shaft 14 is a disc 16 constituting a part of a satellite carrier. The other part is another disc 17 formed with external teeth 18 which mesh with pinion 19 drivably carried by input shaft 20.

Extending between discs 16 and 17 is at least one stub shaft 21. Two of these stub shafts and the satellite gears carried thereby are shown in FIG. 1 but one is sufficient to provide an operative device. The ends of stub shafts 21 are fixed in discs 16 and 17 as by pressed fits. Journaled on stub shaft 21, as by bearings 22 is a satellite gear 23 comprising two sections or gear elements 24 and 25. These elements 24 and 25 are of different radii and the number of teeth on one varies with respect to the number on the other. Thus by way of example section 24 may have 30 teeth while section 25 has 25 teeth.

A drive gear 26 is drivably mounted on output shaft 14 as by welding 27. It meshes with element 25 of the satellite gear. A holding gear 28 is formed with a hub 29 which is journaled in an opening in housing wall 11 by a bearing 30. Reduced extension 15 of the output shaft is journaled in holding gear 28 and hub 29 by a bearing 31. Holding gear 28 meshes with section 24 of the satellite gear.

It will be understood that the number of teeth on drive gear 26 will be different from the number of teeth on holding gear 28 to provide for a desired degree of differential in the amount of angular movement between these gears for each complete orbit of travel of the satellite gear thereabout.

An inner bevelled gear 32 is keyed to extension 15 of the output shaft and has a bevelled face 33 and a hublike extension 34. Keyed on extension 34 and slidable thereon is a bevelled gear 35 having a bevelled face 36 that confronts face 33 of bevelled gear 32. Faces 33 and 36 are formed with radial grooves 37 which are more clearly depicted in FIGS. 3 and 4.

Extension 15 carries at its end a spring retainer 38 and interposed between retainer 38 and bevelled gear 35 is an expansion coil spring 39 that urges bevelled gears 32 and 35 together.

Disposed about bevelled gear 32 is an outer ringlike bevelled gear 40 with a bearing 41 interposed between the two. Gear 40 has a bevelled face 42 which confronts face 33 of gear 32 and is formed with radial grooves 37. Another outer bevelled gear 43 is disposed about gear 35 with a bearing 44 between the two. This bearing assembly 44 locks bevel gears 35 and 43 together as far as axial movement is concerned. It has a bevelled face 45 having radial grooves 37 which confronts face 36 of gear 35 and face 42 of gear 40.

Gears 40 and 43 have external teeth 46 and meshing therewith are pinions 47 pinned to a shaft 48 the ends of which are rotatably mounted in housing wall 11 and another housing part 49 by bearings 50. Pinions 47 and shaft 48 cause bevelled gears 40 and 43 to rotate in unison.

A ringlike plate 51 is disposed about extension 15 in spaced relation with respect thereto and is fastened to outer bevelled gear 40 by screws 52 and to hub extension 29 by screws 53.

The bevelled faces 33, 36, 42 and 45 define a space 54 and positioned in this space is a pin ring 55. The latter is formed with bevelled faces that conform in inclination to the bevelled faces which they confront. They are also formed with a series of axial passages 56 with each passage including end portions and a central enlargement 57. Received in each passage 56 is a pin 58 which has a hub like enlargement 59 received in enlarged space 57.

Figure 4:
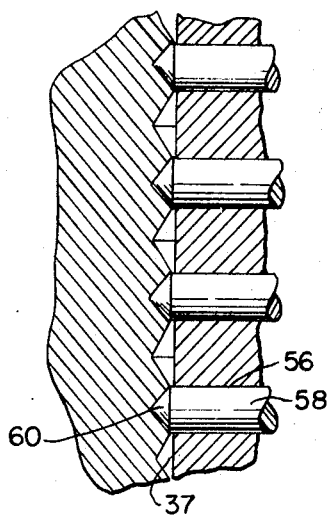
FIG. 4 is a detail taken on an enlarged scale depicting the pin ends and their relation to the grooves.

Upon referring to FIG. 4 it will be noted each end of each pin 58 is formed with a conical tip 60 that it is accurately received in one of grooves 37, or a pair of such grooves where they meet.

Referring now to FIG. 3, pin ring 55 is shown as being carried by a plate 61 having opposed ears 62 and 63. Ear 62 carries a sleeve 64 (FIG. 1) which receives shaft 48 with respect to which it is freely movable. Pivotally connected to ear 63, by a pin and slot connection 9, is a sleeve 65, the bore of which is internally threaded. A screw stem 66 is threaded into sleeve 65 and is mounted in a part of the housing such as shown at 67 for rotation. The end of stem 66 carries an operating member in the form of crank handle 68.

It is evident that crank 68 may be availed of to rotate stem 66 and thereby move sleeve 65. This movement is translated to plate 61 by pin and slot connection 64 to shift pin ring 55 in a plane normal to the axis of the bevelled gears. This movement causes some of the pins to move radially outwardly and other radially inwardly.

OPERATION

With conical tips 60 of pins 58 received in the meeting termini of grooves 37 of both the inner and outer pins of bevelled gears, gear 32 is locked to gear 40 and gear 35 to gear 43. As gear 32 is keyed to extension 15 of the output shaft and gear 40 is connected to hub 29 of holding gear 28 by plate 51, the holding gear 28 and output shaft 14 rotate together with no differential in movement between the two obtaining. Thus, the bevel gears and associated mechanism provide no change in the rate of rotation of these parts.

When it is desired to provide a gear reduction between the input and output shafts crank handle 68 is operated to rotate screw stem 66. Due to the threaded connection of the latter with sleeve 65 the latter is shifted, and, due to the pin and slot connection 64 with plate 61, pin ring 55 is moved in a plane normal to the axis of the bevel gears.

As pin ring 55 shifts, pins 58 are moved to disturb the condition in which the inner and outer bevel gears are locked together. Some of the pins 58 will move radially outwardly and others radially inwardly. Such movements will, in both instances, be in the direction in which the faces of the bevel gears converge. However, it is accommodated by pins 58 moving axially with pin ring 55. As the ends of pins 58 engage the bottoms of the radial grooves in the bevel gears, and, due to the angular disposition of the latter, bevel gears 35 and 43 will move axially against the influence of spring 39. Bearing assembly 44 acts as a mechanical interlock to cause these two bevel gears to move axially in unison.

Pin ring 55 is no longer coaxial with respect to the output shaft and constitutes the driving connection between the inner and outer pair of bevel gears. Those pins which are moved inwardly will have a shorter length of arcuate travel than obtained before such movement while those pins which are moved radially outwardly will have an increased extent of arcuate travel. This causes outer gears 40 and 43 to rotate with respect to inner gears 33 and 35, bearings 41 and 44 accommodating such movement.

Outer gears 40 and 43 are mechanically connected by shaft 48 and pinions 47, and, as gear 40 is connected to holding gear 28 the latter will rotate relative to the output shaft. This rotation results in the gear reduction afforded by the satellite gear. Obviously with a desired ratio established by a shifting of the pin ring it may be reduced by again moving it to a more central position. It is evident that an infinite number of ratios may be obtained within the range of permissible movement of the pin ring relative to the bevel gears.

While a preferred specific embodiment of the invention is hereinbefore set forth, it is to be clearly understood that the invention is not to be limited to the exact construction, mechanism device illustrated and described because various modifications of these details may be provided in putting the invention into practice.

I claim:

1. In a reduction gear transmission including an input shaft, a satellite carrier driven by a pinion on said input shaft, a satellite gear rotatably mounted in said carrier, an output shaft on which said carrier is journaled, a drive gear drivably mounted on said output shaft, a holding gear journaled on said output shaft, and means for establishing a driving relation between said holding gear and said output shaft, the improvement consisting of:
   a. a satellite gear comprising two sections of different radii with one section having a greater number of teeth than the other
   b. the satellite gear section with the smaller number of teeth continuously meshing with the drive gear and that with the larger number of teeth continuously meshing with the holding gear.

2. In a reduction gear transmission including an input shaft, a satellite carrier driven by a pinion on said input shaft, a satellite gear rotatably mounted in said carrier, an output shaft on which said carrier is journaled, a drive gear drivably mounted on said output shaft, a holding gear journaled on said output shaft, said satellite gear continuously meshing with said drive and holding gears to establish a driving relation between said holding gear and said output shaft, the improvement consisting of:
   a. an infinite gear ratio assembly including two elements,
   b. means for drivably connecting one of said elements to the output shaft,
   c. means for connecting the other of said elements to the holding gear, and
   d. a variable driving connection between said elements.

3. The reduction gear transmission of claim 2 in which:
   a. one of said elements comprises an inner pair of confronting bevel gears keyed to the output shaft,
   b. the other of said elements comprises an outer pair of confronting bevel gears disposed about said inner pair,
   c. all of said bevel gears having bevelled faces which define a space, and
   d. the variable driving connection consists of a ring in said space, bevel gear face engaging members carried by said ring, and means to shift said ring in a plane normal to the axis of said bevel gear to move some of said face engaging members radially outwardly and others radially inwardly.

4. The reduction gear transmission of claim 3 in which the bevelled faces of the bevel gears have radial grooves, the ring is formed with a series of longitudinal passages, and the face engaging members take the form of pins in said passages.

5. The reduction gear transmission of claim 4 in which the grooves are of V-cross section and the pins have carried tips received in the grooves.

6. The reduction gear transmission of claim 3 in which the outer pair of bevel gears are mechanically interlocked to rotate in unison.

7. The reduction gear transmission of claim 3 in which the ring is carried by a plate, together with:
  a. a pivotal mounting for said plate,
  b. a sleeve having a threaded bore and connected to said plate opposite to the pivoted mounting by a loose connection.
  c. a screw stem in said threaded bore, and
  d. an operating member for rotating said screw stem.

\* \* \* \* \*